United States Patent
Kawase et al.

(10) Patent No.: US 9,897,893 B2
(45) Date of Patent: Feb. 20, 2018

(54) TERAHERTZ WAVE GENERATION APPARATUS

(71) Applicant: SHIBUYA CORPORATION, Kanazawa-shi, Ishikawa (JP)

(72) Inventors: Kodo Kawase, Aichi (JP); Toshiaki Naka, Kanazawa (JP); Motoi Sasaki, Kanazawa (JP); Akito Tsuchiya, Kanazawa (JP)

(73) Assignee: SHIBUYA CORPORATION, Kanazawa-shi, Ishikawa (JP)

( * ) Notice: Subject to any disclaimer, the term of this patent is extended or adjusted under 35 U.S.C. 154(b) by 0 days.

(21) Appl. No.: 15/411,086

(22) Filed: Jan. 20, 2017

(65) Prior Publication Data

US 2017/0219911 A1    Aug. 3, 2017

(30) Foreign Application Priority Data

Feb. 3, 2016   (JP) ................................ 2016-018902

(51) Int. Cl.
*G02F 1/35* (2006.01)
*G02F 1/39* (2006.01)
(Continued)

(52) U.S. Cl.
CPC .......... *G02F 1/3501* (2013.01); *G02F 1/3532* (2013.01); *G02F 1/39* (2013.01);
(Continued)

(58) Field of Classification Search
None
See application file for complete search history.

(56) References Cited

U.S. PATENT DOCUMENTS 6,697,186 B2 *   2/2004  Kawase ................... G02F 1/39
                                                  359/326
2017/0102604 A1 *  4/2017  Ebrahim-Zadeh ........ G02F 1/39
                              (Continued)

FOREIGN PATENT DOCUMENTS

JP            2002-072269 A      3/2002

*Primary Examiner* — Rhonda Peace
(74) *Attorney, Agent, or Firm* — Flynn, Thiel, Boutell & Tanis, P.C.

(57) ABSTRACT

In a terahertz wave generation apparatus including a first non-linear optical crystal 3 on which first laser L1 and second laser L2 from laser generation means 2 are incident to generate terahertz wave TH1, the laser generation means includes a second non-linear optical crystal 7 on which laser having the same wavelength as that of the second laser is incident to generate idler light L1 including a plurality of wavelengths, and makes the idler light L1 generated from the second non-linear optical crystal incident on the first non-linear optical crystal as the first laser L1, to generate terahertz wave including a plurality of wavelengths from the first non-linear optical crystal 3, and wavelength selection means including a transmission section which transmits an idler light having the specific wavelength in the idler light including the plurality of wavelengths can be provided, as needed. Thus, terahertz wave having a high output power and including a plurality of wavelengths can be obtained, and the wavelength selection means easily obtains a required terahertz wave having the specific wavelength.

7 Claims, 2 Drawing Sheets

(51) Int. Cl.
*H01S 3/00* (2006.01)
*G02F 2/02* (2006.01)

(52) U.S. Cl.
CPC .... *H01S 3/0092* (2013.01); *G02F 2001/3503* (2013.01); *G02F 2001/3507* (2013.01); *G02F 2001/392* (2013.01); *G02F 2201/302* (2013.01); *G02F 2203/13* (2013.01); *H01S 2302/02* (2013.01)

(56) References Cited

U.S. PATENT DOCUMENTS

2017/0176838 A1\* 6/2017 Hu ................... G02F 1/3534
2017/0219911 A1\* 8/2017 Kawase ................ G02F 1/29

\* cited by examiner

TERAHERTZ WAVE GENERATION APPARATUS

BACKGROUND OF THE INVENTION

Field of the Invention

The present invention relates to a terahertz wave generation apparatus, and more specifically, to a terahertz wave generation apparatus configured to generate terahertz wave by a parametric effect of a first non-linear optical crystal.

Description of the Related Art

Conventionally, there has been known a terahertz wave generation apparatus including laser generation means for generating first laser serving as seed beam and second laser serving as pump beam, and a first non-linear optical crystal on which the first laser and the second laser are incident to generate terahertz wave by a parametric effect (see Japanese Patent Laid-Open No. 2002-72269).

In the above-described terahertz wave generation apparatus, when the first laser serving as seed beam and the second laser serving as pump beam are incident on the first non-linear optical crystal, terahertz wave of a pulse having a high peak output power can be generated in a narrowed spectrum width from the first non-linear optical crystal.

In Japanese Patent Laid-Open No. 2002-72269, laser having a single wavelength is used as each of the first laser and the second laser. As a result, terahertz wave is generated in a narrowed spectrum width. In other words, terahertz wave cannot be generated in a wide wavelength band.

In view of such circumstances, the present invention is directed to providing a terahertz wave generation apparatus capable of generating terahertz wave having a high output power in a wide wavelength band.

SUMMARY OF THE INVENTION

According to a first aspect of the present invention, there is provided a terahertz wave generation apparatus including laser generation means for generating first laser serving as seed beam and second laser serving as pump beam, and a first non-linear optical crystal on which the first laser and the second laser are incident to generate terahertz wave by a parametric effect, in which the laser generation means includes a second non-linear optical crystal on which laser having the same wavelength as that of the second laser is incident to generate idler light including a plurality of wavelengths, and makes the idler light generated from the second non-linear optical crystal incident on the first non-linear optical crystal as the first laser, to generate terahertz wave including a plurality of wavelengths from the first non-linear optical crystal.

According to a third aspect of the present invention, the terahertz wave generation apparatus is characterized by further including wavelength selection means including a transmission section which transmits only an idler light beam having the specific wavelength in the idler light including the plurality of wavelengths generated from the second non-linear optical crystal, in which a terahertz wave having the specific wavelength is generated from the first non-linear optical crystal based on the idler light having the specific wavelength which has been transmitted by the transmission section in the wavelength selection means.

According to the first aspect of the invention, the laser generation means can generate the idler light including the plurality of wavelengths by making the laser having the same wavelength as that of the second laser incident on the second non-linear optical crystal, and can generate the terahertz wave having a high output power and including the plurality of wavelengths by making the idler light including the plurality of wavelengths incident on the first non-linear optical crystal as the first laser.

Therefore, when the terahertz wave is transmitted by an object to be inspected to inspect a component of the object to be inspected, the component of the object to be inspected can be inspected at one time because the terahertz wave has a wide wavelength band compared to when terahertz wave having each wavelength is transmitted by the object to be inspected.

The terahertz wave generated from the first non-linear optical crystal is injected at angles which differ depending on the wavelengths. Thus, spectral analysis is easily performed. That is, when inspection is performed with ray having a mixture of a plurality of wavelengths, the ray needs to be separated for each of the wavelengths on the ray receiving side. However, according to the present invention, such an operation can be omitted.

Further, according to the third aspect of the present invention, the transmission section in the wavelength selection means can transmit only the idler light having the specific wavelength in the idler light including the plurality of wavelengths generated from the second non-linear optical crystal. Thus, the wavelength selection means can selectively use only the idler light having the specific wavelength without changing the wavelength of the idler light itself generated from the second non-linear optical crystal.

DETAILED DESCRIPTION OF THE PREFERRED EMBODIMENT

Figure 1:
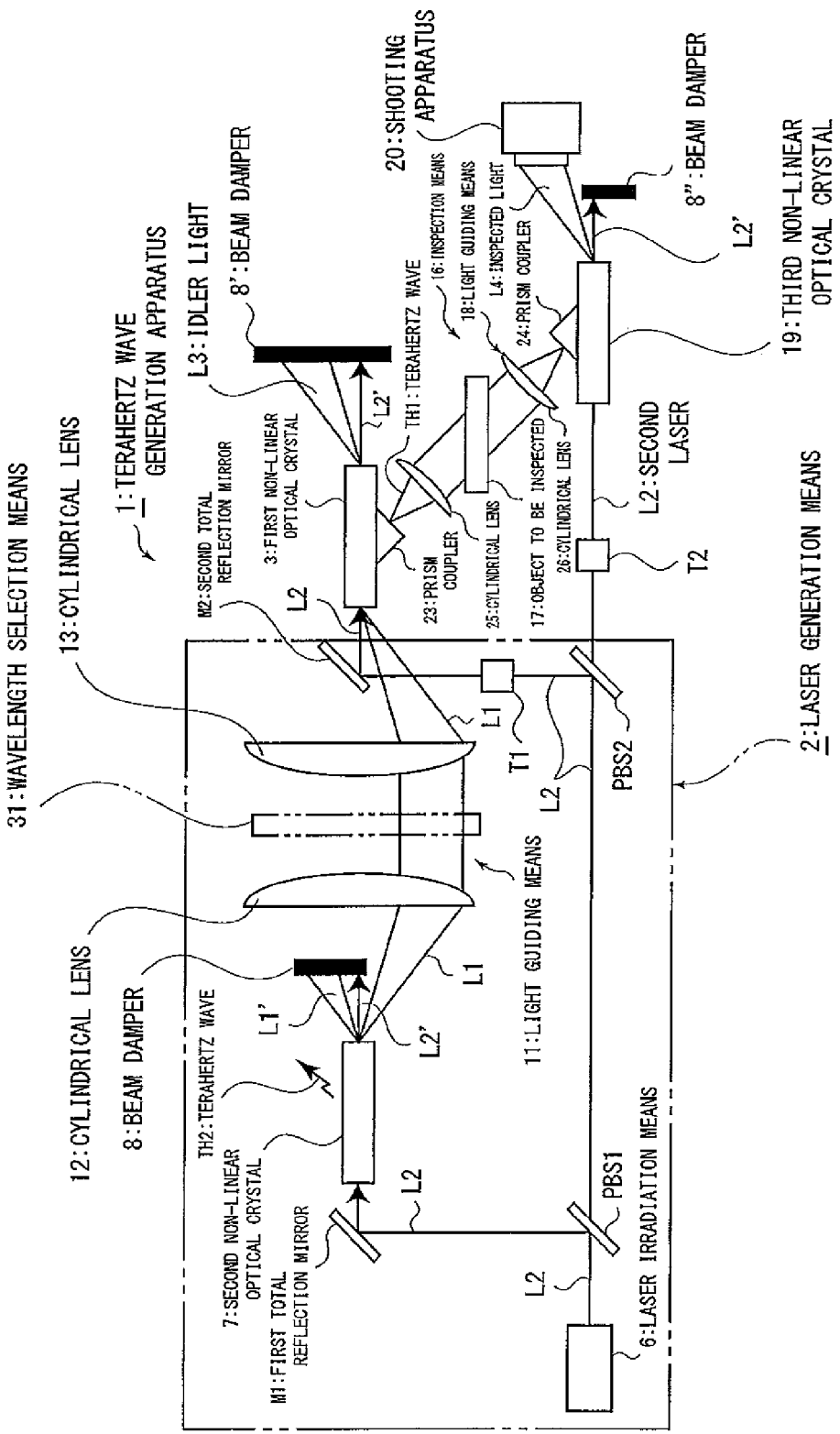
FIG. 1 is an arrangement diagram illustrating an embodiment of the present invention.

When the present invention is described for an embodiment illustrated below, a terahertz wave generation apparatus 1 includes laser generation means 2 for generating first laser L1 serving as seed beam and second laser L2 serving as pump beam, and a first non-linear optical crystal 3 on which both the laser L1 and the laser L2 are incident to generate idler light L3 and terahertz wave TH1.

An injection seeded terahertz-wave parametric generator (Is-TPG), which generates the idler light L3 and the terahertz wave TH1 by making the first laser L1 serving as seed beam and the second laser L2 serving as pump beam on the first non-linear optical crystal 3, is configured.

In a terahertz wave generation apparatus disclosed in Japanese Patent Laid-Open No. 2002-72269, laser having a single wavelength is used as each of first laser serving as seed beam and second laser serving as pump beam and as a result, terahertz wave generated by a first non-linear optical crystal also has a spectrum width in a narrow wavelength band. However, in the present embodiment, the first laser L1 serving as seed beam has a spectrum width in a wide wavelength band and is spatially separated for each wavelength. Thus, the terahertz wave TH1 generated by the first non-linear optical crystal 3 also has a spectrum width in a wide wavelength band.

The laser generation means 2 includes laser irradiation means 6 for oscillating the second laser L2 serving as pump beam to be input to the first non-linear optical crystal 3. A semiconductor laser for oscillating a pulsed laser can be used as the laser irradiation means 6.

In the present embodiment, the second laser L2 oscillated by the laser irradiation means 6 is branched into two beams by a second polarization beam splitter PBS2 provided on an optical axis of the second laser L2, and the branched second optical laser L2 is incident on the first non-linear optical crystal 3 from on an optical axis of the first non-linear optical crystal 3 via a second total reflection mirror M2.

The laser generation means 2 includes a first polarization beam splitter PBS1 provided at a position before the second polarization beam splitter PBS2 on the optical axis of the second laser L2, and the second laser L2 branched by the first polarization beam splitter PBS1 is incident on a second non-linear optical crystal 7 from on an optical axis of the second non-linear optical crystal 7 via a first total reflection mirror M1.

In the present embodiment, the optical axis of the first non-linear optical crystal 3 and the optical axis of the second non-linear optical crystal 7 are made to match each other, and the first non-linear optical crystal 3 and the second non-linear optical crystal 7 respectively use optical crystals having the same configuration.

When the second laser L2 is incident on the second non-linear optical crystal 7 from a fixed direction, e.g., from on the optical axis of the second non-linear optical crystal 7, like in the illustrated embodiment, for example, idler light L1 and idler light L1' are generated while terahertz wave TH2 is generated. In this case, while the idler light L1 and the idler light L1' and the terahertz wave TH2 are generated in a wide wavelength band, their respective output powers are weak.

A terahertz-wave parametric generator (TPG), which generates the idler light L1 and the idler light L1' and the terahertz wave TH2 by making the second laser L2 serving as pump beam incident on the second non-linear optical crystal 7, is configured.

In the present embodiment, while the one idler light L1 is used as the above-described first laser L1, described in detail below, the other idler light L1' is not used. The idler light L1' and second laser L2', which has been no longer required after passing through the second non-linear optical crystal 7, are absorbed by a beam damper 8. Further, the above-described terahertz wave TH2 is consumed as it is.

The idler light L1, which has been generated by the second non-linear optical crystal 7, is incident on the non-linear optical crystal 3 as the first laser L1, as described above, via light guiding means 11 for guiding the idler light L1.

The above-described idler light L1, i.e., the first laser L1 has a wide wavelength band. Thus, the first non-linear optical crystal 3, on which the first laser L1 and the second laser L2 serving as pump beam are incident, generates the idler light L3 and the terahertz wave TH1 each having a high output power and having a wide wavelength band.

In the present embodiment, the idler light L3 and second laser L2', which has been no longer required after passing through the first non-linear optical crystal 3, are absorbed by a beam damper 8', and only the terahertz wave TH1 is used.

The second laser L2 of a pulsed laser oscillated by the laser irradiation means 6 is incident on the second non-linear optical crystal 7 at a timing delayed by an amount corresponding to its optical path length. When the second laser L2 is incident on the second non-linear optical crystal 7, the idler light L1 and the idler light L1' are generated at the same timing as a timing of the incidence. The idler light L1 is incident on the first non-linear optical crystal 3 as first laser L1 at a timing delayed by an amount corresponding to its optical path length via the light guiding means 11.

On the other hand, the second laser L2 of the pulsed laser oscillated by the laser irradiation means 6 is incident on the first non-linear optical crystal 3 at a timing delayed by an amount corresponding to its optical path length. However, in this case, conventionally known timing adjustment means T1 is provided between the second polarization beam splitter PBS2 and the second total reflection mirror M2. The timing adjustment means T1 causes the second laser L2 to be incident on the first non-linear optical crystal 3 at a timing matching the timing at which the above-described first laser L1 is incident on the first non-linear optical crystal 3.

When the first laser L1 and the second laser L2 are simultaneously incident on the first non-linear optical crystal 3, the above-described terahertz wave TH1 is generated at the same timing as a timing of the incidence.

The light guiding means 11 includes a pair of cylindrical lenses 12 and 13 arranged while their respective centers are made to match each other between the second non-linear optical crystal 7 and the first non-linear optical crystal 3 on the optical axis of the first and second non-linear optical crystals 3 and 7, and the cylindrical lens 12 on the side adjacent to the second non-linear optical crystal 7 is spaced only a focal length f (see FIG. 2) of the cylindrical lens 12 apart from a generation point of the above-described idler light L1. Thus, the idler light L1, which has passed through the cylindrical lens 12, is converted into parallel beam parallel to the above-described optical axis.

A cross-sectional shape of the idler light L1 generated from the second non-linear optical crystal 7 is a horizontally long elliptical cross-sectional shape in a direction perpendicular to a sheet surface of FIG. 1. Therefore, the above-described parallel light also has an elliptical cross-sectional shape. Both the cylindrical lenses 12 and 13 have the same single-focus configuration, and are each composed of BK7, silica glass, or the like. The cylindrical lenses 12 and 13 may be each composed of a spherical plane-convex lens.

Figure 2:
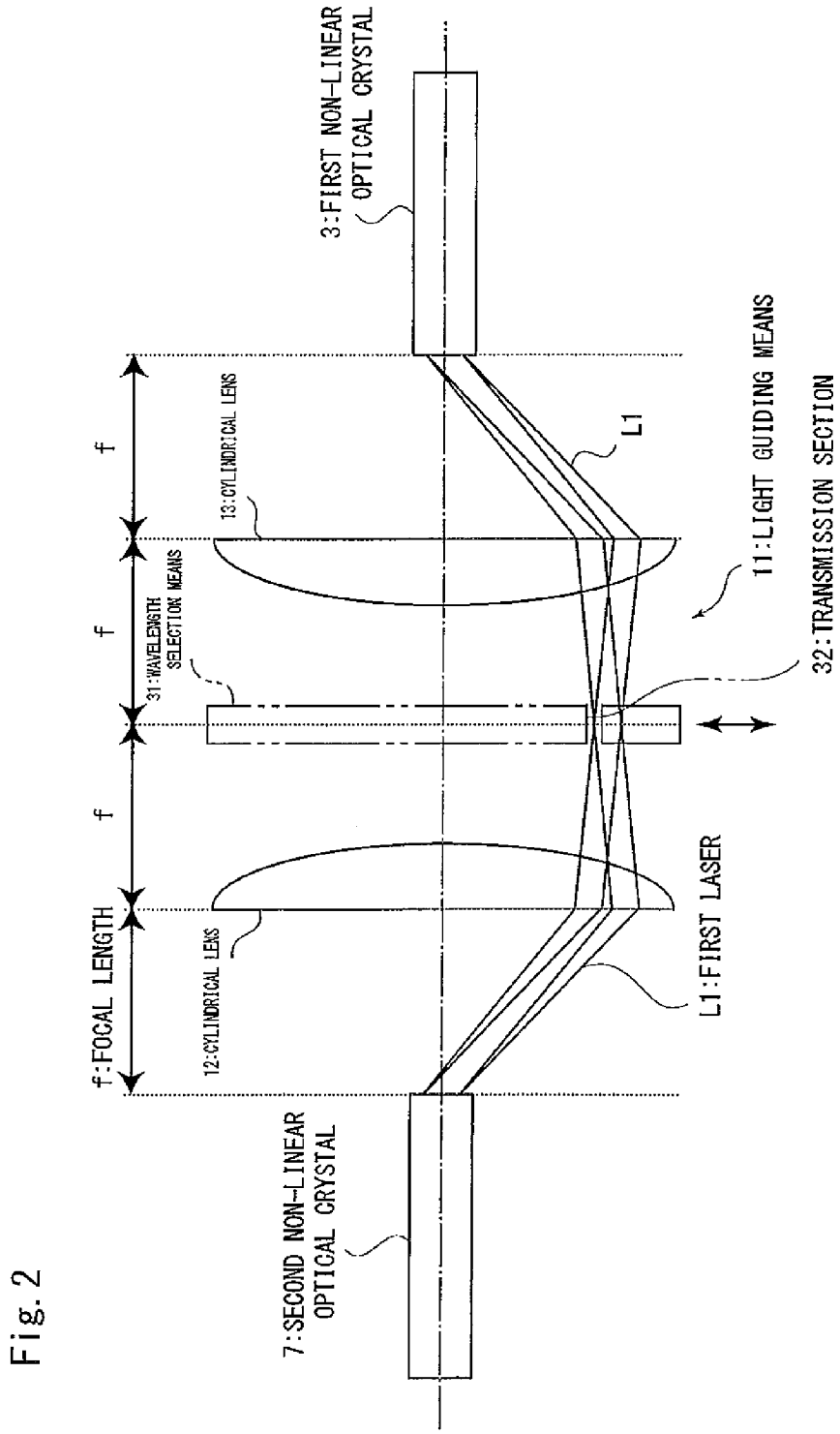
FIG. 2 is an enlarged view of a principal part illustrated in FIG. 1.

As illustrated in FIG. 2, the idler light L1, which has passed through the cylindrical lens 12, is converted into parallel light parallel to the above-described optical axis. However, the idler light L1 is generated with a predetermined width. Thus, idler light L1 generated from a position separated by the focal length f from the cylindrical lens 12 is converted into parallel light while idler light L1 generated by shifting in a direction perpendicular to the optical axis from the position separated by the focal length f is refracted to intersect the above-described parallel light at a position separated by the focal length f from the cylindrical lens 12.

Therefore, the idler light L1, which has passed through the cylindrical lens 12, is converged at the position separated by the focal length f from the cylindrical lens 12 while being diffused therefrom and incident on the cylindrical lens 13.

As a result, the idler light L1 emitted from the second non-linear optical crystal 7 and first laser L1 incident on the first non-linear optical crystal 3 after passing through the cylindrical lens 13 are optically symmetrical with high accuracy with respect to a surface perpendicular to the above-described optical axis after passing through the position separated by the focal length f from the two cylindrical lenses 12 and 13 at the center of the cylindrical lenses 12 and 13. Therefore, an angle of emission to an optical axis of the idler light L1 emitted from the second non-linear optical crystal 7 and an angle of incidence to an optical axis of the first laser L1 incident on the first non-linear optical crystal 3 after passing through the cylindrical lens 13 are substantially the same.

In this state, the first non-linear optical crystal 3 and the second non-linear optical crystal 7 have the same configuration. Thus, the first laser L1 incident on the first non-linear optical crystal 3 is automatically incident on the first non-linear optical crystal 3 with a condition of phase alignment with the first non-linear optical crystal 3 satisfied.

In the present embodiment, inspection means 16 using the terahertz wave TH1 output from the first non-linear optical crystal 3 is provided, as illustrated in FIG. 1. When the terahertz wave TH1 is transmitted by an object to be inspected 17 such as a container, an envelope, or a living specimen, a component of the object to be inspected 17 can be inspected.

The inspection means 16 includes light guiding means 18 for guiding the terahertz wave TH1 by a similar configuration to that of the light guiding means 11, a third non-linear optical crystal 19 on which the terahertz wave TH1 guided by the light guiding means 18 is incident, and a shooting apparatus 20 such as a charge-coupled device (CCD) camera into which idler light generated from the third non-linear optical crystal 19 is input as inspected light L4.

The third non-linear optical crystal 19 is arranged on an optical axis of the second laser L2 oscillated by the laser irradiation means 6 so that the second laser L2, which has passed through the second polarization beam splitter PBS2, is incident on the third non-linear optical crystal 19. In the present embodiment, the same optical crystal as the first non-linear optical crystal 3 and second non-linear optical crystal 7 is also used as the third non-linear optical crystal 19.

Prism couplers 23 and 24 are respectively provided on a surface, on the side on which the terahertz wave TH1 is generated, of the first non-linear optical crystal 3 and a surface, on the side on which the terahertz wave TH1 is incident, of the third non-linear optical crystal 19 are provided, and the light guiding means 18 is arranged between both the prism couplers 23 and 24.

The light guiding means 18 includes a pair of cylindrical lenses 25 and 26, like the light guiding means 11. Both the cylindrical lenses 25 and 26 are respectively spaced only their focal length apart from the prism couplers 23 and 24, and the object to be inspected 17 is arranged at an intermediate position therebetween.

Thus, the terahertz wave TH1 emitted from the prism coupler 23 in the first non-linear optical crystal 3 is converted into parallel light parallel to its optical axis by the cylindrical lens 25 on the side adjacent to the first non-linear optical crystal 3, is transmitted through the object to be inspected 17, is then converged by the cylindrical lens 26 on the side adjacent to the third non-linear optical crystal 19, and is incident on the third non-linear optical crystal 19 via the prism coupler 24.

As described above, when the first laser L1 and the second laser L2 are simultaneously incident on the first non-linear optical crystal 3, the above-described terahertz wave TH1 is generated at the same timing as a timing of the incidence. However, the pulse-shaped terahertz wave TH1 is incident on the third non-linear optical crystal 19 at a timing delayed by an amount corresponding to its optical path length via the light guiding means 18.

On the other hand, the second laser L2 of the pulsed laser oscillated by the laser irradiation means 6 is incident on the third non-linear optical crystal 19 at a timing delayed by an amount corresponding to its optical path length. However, in this case, conventionally known timing adjustment means T2 is provided between the second polarization beam splitter PBS2 and the third non-linear optical crystal 19. The timing adjustment means T2 causes the second laser L2 to be incident on the third non-linear optical crystal 19 at a timing matching a timing at which the above-described terahertz wave TH1 is incident on the third non-linear optical crystal 19.

The first non-linear optical crystal 3 and the third non-linear optical crystal 19 are optically symmetrical with respect to a middle position of the pair of cylindrical lenses 25 and 26. When the terahertz wave TH1 and the second laser L2 are incident on the third non-linear optical crystal 19, the inspected light (idler light) L4 is generated from the third non-linear optical crystal 19 by a reverse phenomenon to that in the first non-linear optical crystal 3. When the inspected light L4 is received by the shooting apparatus 20, and a wavelength component to be absorbed is then spectrally analyzed, a component, a characteristic, and the like of the object to be inspected 17 are inspected.

In this case, the terahertz wave TH1 input to the third non-linear optical crystal 19 has a wide wavelength band. Thus, the inspected light L4 also has a wide wavelength band. Therefore, a component of the object to be inspected 17, for example, can be inspected at one time with the terahertz wave TH1 having a wide wavelength band.

Second laser L2', which has passed through the third non-linear optical crystal 19, is absorbed by a beam damper 8".

In the terahertz wave generation apparatus 1 having the foregoing configuration, a semiconductor laser, which oscillates a picosecond pulsed laser having an output power of 15 mJ and having a wavelength of 1064 nm can be used as a specific example of the above-described continuous laser irradiation means 6. The second laser L2 oscillated by the continuous laser irradiation means 6 is branched into second laser having an output power of 3 mJ and second laser having an output power of 12 mJ as an example by the first polarization beam splitter PBS1, and the second laser L2 having the output power of 3 mJ is input to the second non-linear optical crystal 7.

The second laser L2 having the output power of 12 mJ is branched into second laser having an output power of 7 mJ and second laser having an output power of 5 mJ as an example by the second polarization beam splitter PBS2. The second laser L2 having the output power of 7 mJ is input to the first non-linear optical crystal 3, and the second laser L2 having the output power of 5 mJ is input to the third non-linear optical crystal 19.

All the above-described first to third non-linear optical crystals 3, 7, and 19 are preferably made of the same material. For example, $LiNbO_3$ (lithium niobate) can be used.

When the above-described second laser L2 having the wavelength of 1064 nm is incident on the second non-linear optical crystal 7 made of $LiNbO_3$, idler light L1 in a wavelength range of 1070 to 1075 nm is obtained.

When the idler light L1 in the wavelength range of 1070 to 1075 nm is incident on the first non-linear optical crystal 3 made of $LiNbO_3$ as the first laser L1, terahertz wave TH1 in a wavelength range of 1 to 3 THz is obtained.

When the terahertz wave TH1, which has been transmitted by the object to be inspected 17, is incident on the third non-linear optical crystal 19, inspected light L4 in a wavelength range of 1070 to 1075 nm can be obtained.

In the above-described embodiment, the terahertz wave TH1 having a wide wavelength band is generated by the first non-linear optical crystal 3. However, the terahertz wave TH1 having a narrow wavelength band can be selectively generated, as needed.

In this case, wavelength selection means 31 for inhibiting the passage of light is provided at a focal position at the center of the pair of cylindrical lenses 12 and 13, as indicated by an imaginary line in FIG. 2, so that a transmission section 32 such as a slit provided in the wavelength selection means 31 may be able to select the transmission of only an idler light L1 having a specific wavelength from the idler light L1 having a wide wavelength band which has passed through the cylindrical lens 12.

That is, the idler light L1 has a wide wavelength band, as described above. Thus, the idler light L1, which has passed through the cylindrical lens 12, is converged at a position separated by the focal length f from the cylindrical lens 12 for each wavelength while being diffused and incident on the cylindrical lens 13.

The transmission section 32 has a horizontally long shape which is thin in a direction perpendicular to a sheet surface of FIG. 2 so that one wavelength can be substantially selected. Thus, only a specific wavelength is permitted to be transmitted by the transmission section 32 from the idler light L1 having a wide wavelength band, and the transmission of the other wavelength can be interrupted by the wavelength selection means 31.

Thus, if the wavelength selection means 31 is provided with the transmission section 32, to permit the transmission of the idler light L1 having only the specific wavelength, the first laser L1 having only the specific wavelength can be incident on the first non-linear optical crystal 3. Thus, the terahertz wave TH1 generated by the first non-linear optical crystal 3 also becomes a terahertz wave TH1 having only the specific wavelength dependent on the idler light L1 having only the specific wavelength.

When the wavelength of the terahertz wave TH1 is changed, the wavelength selection means 31 is moved in a vertical direction intersecting the optical axis of the idler light L1, indicated by an arrow in FIG. 2. Thus, the wavelength, which is transmitted by the transmission section 32 from the idler light L1, is changed so that the wavelength of the terahertz wave TH1 can be easily changed.

That is, the transmission section 32 is movable back and forth in a direction from a long wavelength to a short wavelength in a cross-sectional shape of the idler light L1 having a wide wavelength band. Thus, the idler light L1 having a required wavelength can be selected.

The wavelength selection means 31 may be moved automatically or manually. Alternatively, a plurality of wavelength selection means 31, which are made to differ in position of the transmission section 32, may be prepared and replaced with one another. While the wavelength selection means 31 is preferably provided at the focal position at the center of the pair of cylindrical lenses 12 and 13 in terms of enhancing wavelength selection accuracy, the present invention is not necessarily be limited to that.

While the terahertz wave TH1 is transmitted by the object to be inspected 17 to inspect a component of the object to be inspected 17 in the above-described embodiment, the terahertz wave TH1 reflected by the object to be inspected 17 may be detected to inspect its component.

In this case, the third non-linear optical crystal 19 and the shooting apparatus 20 may be arranged above the object to be inspected 17 in FIG. 1, i.e., on the side of the first non-linear optical crystal 3, and the terahertz wave TH1 reflected by the object to be inspected 17 may be collected by the cylindrical lens 26 and incident on the third non-linear optical crystal 19 via the prism coupler 24 provided in the third non-linear optical crystal 19. When the inspected light L4 generated from the third non-linear optical crystal 19 is received by the shooting apparatus 20, and a wavelength component reflected by the object to be inspected 17 is spectrally analyzed, a component, a characteristic, and the like of the object to be inspected 17 can be inspected.

While the second laser L2', which has passed through the second non-linear optical crystal 7, is absorbed by the beam damper 8 in the above-described embodiment, the beam damper 8, the second polarization beam splitter PBS2, and the second total reflection mirror M2 may be omitted so that the second laser L2', which has passed through the second non-linear optical crystal 7, is further transmitted by the pair of cylindrical lenses 12 and 13 and incident on the first non-linear optical crystal 3 as the second laser L2.

While the pulsed laser oscillated by the laser irradiation means 6 is divided by the beam splitters PBS1 and PBS2 and incident on the first non-linear optical crystal 3, the second non-linear optical crystal 7, and the third non-linear optical crystal 19 in the above-described embodiment, laser irradiation means may be separately provided for the first non-linear optical crystal 3, the second non-linear optical crystal 7, and the third non-linear optical crystal 19 so that pulsed lasers are respectively incident on the non-linear optical crystals from the laser irradiation means. Also in this case, respective timings at which the pulsed lasers are incident on the first non-linear optical crystal 3, the second non-linear optical crystal 7, and the third non-linear optical crystal 19 need to be adjusted, like in the foregoing.

While the first non-linear optical crystal 3 and the second non-linear optical crystal 7 are arranged on the same axis in the above-described embodiment, the present invention is not limited to this. If the first laser L1 guided by the light guiding means 11 is properly incident on the first non-linear optical crystal 3, the first non-linear optical crystal 3 may be arranged at a different position from that on the above-described same axis.

Furthermore, while $LiNbO_3$ is used as the first to third non-linear optical crystals 3, 7, and 19, the present invention is not limited to this. If all the first to third non-linear optical crystals have the same configuration, a proper phase alignment condition is easily obtained. However, the present invention is not limited to this. Non-linear optical crystals respectively having different configurations can be combined with one another. Further, a material for and a numerical value of each of the above-described components are one example, and an appropriate material and an appropriate numerical value can be used, as needed.

REFERENCE SIGNS LIST

1 Terahertz wave generation apparatus
2 Laser generation means
3 First non-linear optical crystal
6 Laser irradiation means
7 Second non-linear optical crystal
11 light guiding means
12,13 Cylindrical lens
16 Inspection means
17 Object to be inspected
19 Third non-linear optical crystal
20 Shooting apparatus
31 Wavelength selection means
32 Transmission section
L1 First laser
L2 Second laser
TH1 Terahertz wave

What is claimed is:

1. A terahertz wave generation apparatus characterized by comprising laser generation means for generating a first laser serving as a seed beam and a second laser serving as a pump beam, and a first non-linear optical crystal on which the first laser and the second laser are incident to generate a terahertz wave by a parametric effect, wherein
the laser generation means comprises a second non-linear optical crystal on which a laser having the same wavelength as that of the second laser is incident to generate an idler light including a plurality of wavelengths, and makes the idler light generated from the second non-linear optical crystal incident on the first non-linear optical crystal as the first laser, to generate a terahertz wave including a plurality of wavelengths from the first non-linear optical crystal.

2. The terahertz wave generation apparatus according to claim 1, characterized by further comprising
light guiding means for guiding the idler light generated from the second non-linear optical crystal and making the guided idler light incident on the first non-linear optical crystal between the first non-linear optical crystal and the second non-linear optical crystal,
wherein the light guiding means includes a pair of lenses having the same focal length spaced a predetermined distance apart from each other while being arranged so that respective axes of the pair of lenses are positioned on the same line, and the lens on the side of the second non-linear optical crystal in the pair of lenses is spaced the focal length apart from a generation point of the idler light in the second non-linear optical crystal.

3. The terahertz wave generation apparatus according to claim 1, characterized by further comprising wavelength selection means including a transmission section which transmits an idler light having the specific wavelength in the idler light including the plurality of wavelengths generated from the second non-linear optical crystal,
wherein a terahertz wave having the specific wavelength is generated from the first non-linear optical crystal based on the idler light having the specific wavelength which has been transmitted by the transmission section in the wavelength selection means.

4. The terahertz wave generation apparatus according to claim 3, characterized in that the wavelength selection means is arranged between the pair of lenses.

5. The terahertz wave generation apparatus according to claim 4, characterized in that the transmission section in the wavelength selection means is moved in a direction intersecting an optical axis of the idler light so that the wavelength of the idler light transmitted by the transmission section is changeable.

6. The terahertz wave generation apparatus according to claim 4, characterized in that the lenses in the pair of lenses are spaced a distance, which is two times the focal length, apart from each other, and the wavelength selection means is arranged at a middle position of the pair of lenses.

7. The terahertz wave generation apparatus according to claim 1, characterized by further comprising inspection means for transmitting the terahertz wave output from the first non-linear optical crystal by an object to be inspected and inspecting a component of the object to be inspected.

* * * * *